United States Patent
Yasuhara et al.

(10) Patent No.: US 6,998,752 B2
(45) Date of Patent: Feb. 14, 2006

(54) DYNAMO-ELECTRIC MACHINE

(75) Inventors: Takashi Yasuhara, Tokyo (JP); Toshiaki Ueda, Tokyo (JP); Takeyuki Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/451,813

(22) PCT Filed: Dec. 27, 2000

(86) PCT No.: PCT/JP00/09300

§ 371 (c)(1),
(2), (4) Date: Oct. 8, 2003

(87) PCT Pub. No.: WO02/056446

PCT Pub. Date: Jul. 18, 2002

(65) Prior Publication Data

US 2004/0113508 A1     Jun. 17, 2004

(51) Int. Cl.
*H02K 17/16*     (2006.01)

(52) U.S. Cl. .......................................... 310/211; 29/598

(58) Field of Classification Search ................. 310/166, 310/169, 211, 212; 29/596, 598; 228/112.1, 228/114.5, 113, 119, 2.1
See application file for complete search history.

(56) References Cited

U.S. PATENT DOCUMENTS

| | | | | |
|---|---|---|---|---|
| 3,694,906 A | * | 10/1972 | Rank et al. | 29/598 |
| 4,158,225 A | * | 6/1979 | Hertz | 363/150 |
| 4,564,777 A | * | 1/1986 | Senoo et al. | 310/156.81 |
| 5,389,847 A | * | 2/1995 | Nakamura et al. | 310/197 |
| 5,460,317 A | * | 10/1995 | Thomas et al. | 228/112.1 |
| 5,794,835 A | * | 8/1998 | Colligan et al. | |
| 5,813,592 A | * | 9/1998 | Midling et al. | 228/112.1 |
| 6,051,325 A | * | 4/2000 | Talwar et al. | 428/593 |
| 6,053,391 A | * | 4/2000 | Heideman et al. | 228/2.1 |
| 6,064,410 A | * | 5/2000 | Wen et al. | 347/111 |
| 6,088,906 A | * | 7/2000 | Hsu et al. | 29/598 |
| 6,092,277 A | * | 7/2000 | Beltowski et al. | 29/598 |
| 6,177,750 B1 | * | 1/2001 | Tompkin | 310/261 |
| 6,250,037 B1 | * | 6/2001 | Ezumi et al. | |
| 6,290,117 B1 | * | 9/2001 | Kawasaki et al. | |
| 6,619,533 B1 | * | 9/2003 | Hootman et al. | 228/112.1 |

FOREIGN PATENT DOCUMENTS

| | | | | |
|---|---|---|---|---|
| JP | 361224846 | * | 10/1986 | 29/598 |
| JP | 61-251440 | | 11/1986 | |
| JP | 40201189 | * | 7/1988 | 310/216 |
| JP | 404308444 | * | 10/1992 | 310/211 |
| JP | 5-207714 | | 8/1993 | |
| JP | 9-117119 | | 5/1997 | |
| JP | 2000-317654 | | 11/2000 | |
| JP | 020022291211 | * | 10/2002 | 310/211 |
| JP | 020033274621 | * | 9/2003 | 310/211 |

* cited by examiner

*Primary Examiner*—Tran Nguyen
(74) *Attorney, Agent, or Firm*—Crowell & Moring LLP

(57) ABSTRACT

Conductor bars 7a and end rings 7b, 7c of a rotor 5 of a rotary electric machine are made of an aluminum material. The end rings 7b, 7c are electrically and mechanically joined to the opposite ends of the conductor bars 7a with friction stir welding.

25 Claims, 7 Drawing Sheets

DYNAMO-ELECTRIC MACHINE

TECHNICAL FIELD

The present invention relates to a rotary electric machine, and more particularly to a rotary electric machine including a rotor suitable for use in an induction machine.

BACKGROUND ART

As disclosed in JP,A 61-251440, for example, a rotor of a conventional induction electric motor having a relatively small capacity comprises a rotor core, conductor bars, and end rings. The rotor core is formed by stacking a plurality of silicon steel sheets one above another, and a plurality of conductor bars are arranged in holes formed in the rotor core. The end rings are fixed to opposite ends of the conductor bars. The conductor bars and the end rings are made of aluminum or an aluminum alloy. The conductor bars and the end rings are integrally molded by die casting with high mass production.

DISCLOSURE OF THE INVENTION

However, because conventional die casting is performed as high-pressure casting, there has been a problem that porosity defects occur in the conductor bars and the end rings. When a current flows through the conductor bars and the end rings of the rotor, motor torque is generated with interaction of the current and magnetic flux. If porosities are present in a part of the conductor bars and the end rings, it is difficult to improve characteristics of the rotary electric machine any more because of a reduction of torque caused upon impediment of the current flow and abnormal overheating in a porosity portion. Also, the presence of the porosity portion causes an unbalance during the rotation of the rotor, and hence an unbalance correcting step is essential.

For the purpose of preventing the occurrence of porosities during the die casting, various improvements have proposed in points, for example, carrying out the die casting in a vacuum, modifying the shape of a casting gate, preheating dies used in the die casting, and modifying the surface shapes of dies so that air will not be entrapped during the die casting. However, a satisfactorily effective solution is not yet found at present.

It is an object of the present invention to provide a rotary electric machine including a rotor free from a porosity failure.

To achieve the above object, according to the present invention, in a rotary electric machine comprising a stator and a rotor arranged in an opposed relation to a stator, the rotor comprising a core, a plurality of conductor bars inserted respectively through a plurality of holes axially formed in the core, and end rings attached to opposite ends of the conductor bars, the conductor bars and the end rings are made of an aluminum material, and the end rings are electrically and mechanically joined to the opposite ends of the conductor bars with friction stir welding.

With such a construction, a rotary electric machine including a rotor free from a porosity failure can be provided.

BEST MODE FOR CARRYING OUT THE INVENTION

The construction of an induction electric motor, i.e., a rotary electric machine, according to a first embodiment of the present invention will be described below with reference to FIGS. 1 to 6.

Figure 1:
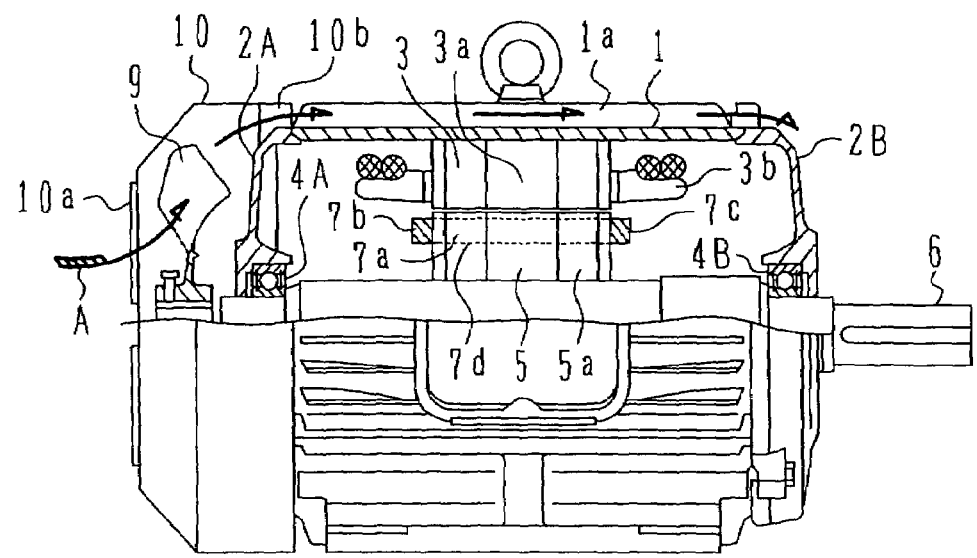
FIG. 1 is a front view, sectioned in an upper half, showing the overall construction of an induction electric motor according to a first embodiment of the present invention.

First of all, a description is made of the overall construction of the induction electric motor according to this embodiment with reference to FIG. 1.

FIG. 1 is a front view, sectioned in an upper half, showing the overall construction of the induction electric motor according to the first embodiment of the present invention.

A housing 1 is formed into a substantially cylindrical shape by casting an iron-base material, such as cast iron, and constitutes a casing of an electric motor. A plurality of heat radiating fins 1a are provided on an outer periphery of the housing 1 to extend in the axial direction and are integrally formed with the housing 1 in a radial pattern. End brackets 2A, 2B are attached to openings at opposite end of the housing 1 with spigot joints. A stator 3 comprises stator core 3a and a stator coil 3b. The stator 3 is fitted to an inner periphery portion of the housing 1 and is fixedly held in place. The stator core 3a is formed by stacking a plurality of silicon steel sheets one above another. The stator coil 3b is wound in a plurality of slots formed in an inner peripheral portion of the stator core 3a.

A rotor 5 comprises a stacked core 5a, conductor bars 7a, and end rings 7b, 7c. The detailed construction of the rotor 5 will be described later with reference to FIG. 2. The rotor 5 is attached to an outer peripheral portion of a rotary shaft 6 in an opposed relation to the stator 2.

Opposite ends of the rotary shaft 6 are rotatably held by the end brackets 2A, 2B through bearings 4A, 4B. Also, one end (on the right side as viewed in FIG. 1) of the rotary shaft 6 penetrates through the end bracket 2B and is projected to the exterior so as to serve as an output shaft. The other end (on the left side as viewed in FIG. 1) of the rotary shaft 6 penetrates through the end bracket 2A and is provided with an external cooling fan (outer fan) 9.

The end cover 10 covers the outer fan 9. An opening 10a for taking in open air is formed in one lateral surface of the end cover 10. Further, the other end of the end cover 10 on the side opposed to the opening 10a is formed into an open cylindrical shape so that a radial gap 10b is defined between both outer peripheral portions of the end bracket 2A and of the housing 1 when the end cover 10 is assembled to the end bracket 2A.

In the electric motor, when the rotary shaft 6 is driven, the outer fan 9 is rotated and open air is sucked through the opening 10a in the end cover 10 as indicated by an arrow A. The sucked air passes through the gap 10b and is blown out to the exterior from the other end of the end cover 10. The blown-out air flows along respective surfaces of the end bracket 2A, the heat radiating fins 1a on the housing 1, and the end bracket 2B, whereby the cooling action is realized.

The construction of the rotor of the induction electric motor according to this embodiment will be described below with reference to FIG. 2.

Figure 2:
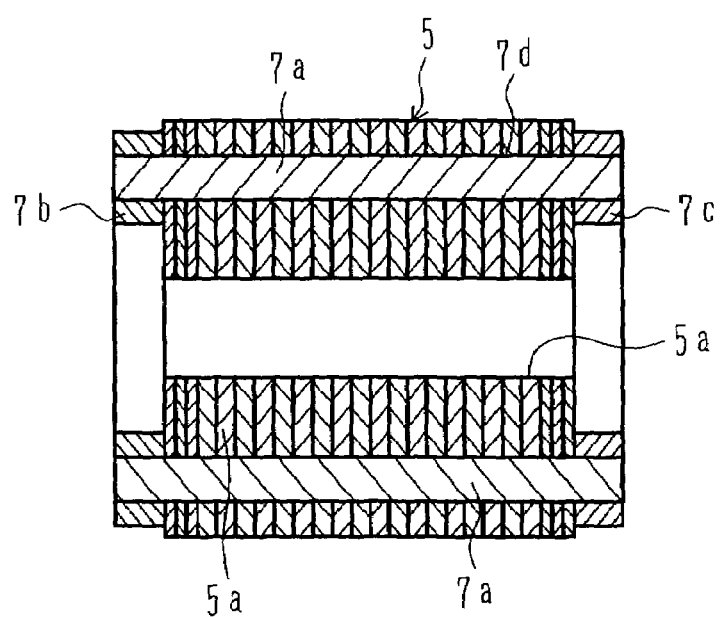
FIG. 2 is a sectional view showing the construction of a rotor used in the induction electric motor according to the first embodiment of the present invention.

FIG. 2 is a sectional view showing the construction of the rotor used in the induction electric motor according to the first embodiment of the present invention.

The rotor 5 comprises the stacked core 5a, the conductor bars 7a, and the end rings 7b, 7c. The stacked core 5a is formed by stacking a predetermined number of thin electromagnetic steel sheets one above another. The stacked core 5a has a plurality of holes 7d for cage-shaped windings, which are each formed so as to extend in the axial direction. The plurality of conductor bars 7a are inserted through the plurality of holes 7d in a one-to-one relation. The end rings 7b, 7c are fixed to opposite ends of the plurality of conductor bars 7a. The conductor bars 7a and the end rings 7b, 7c constitute a cage-shaped winding unit. The conductor bars 7a and the end rings 7b, 7c are each made of aluminum.

A method of manufacturing the rotor of the induction electric motor according to this embodiment will be described below with reference to FIGS. 3 to 6.

Figure 3:
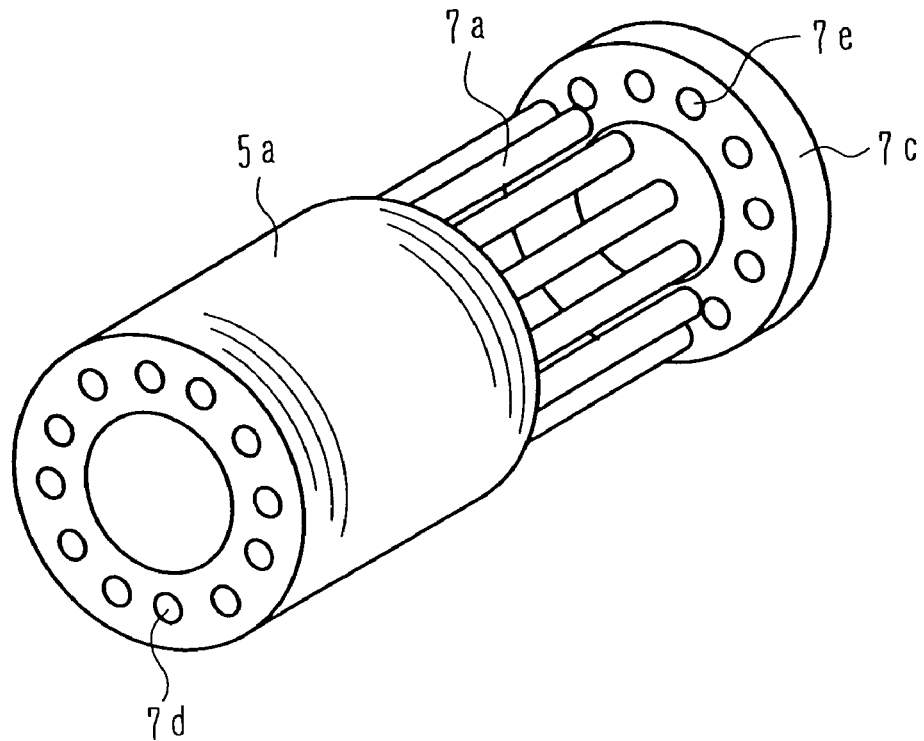
FIG. 3 is an exploded perspective view for explaining a process of manufacturing the rotor used in the induction electric motor according to the first embodiment of the present invention.

A description is now made of an overall manufacturing process of the induction electric motor according to this embodiment with reference to FIG. 3.

FIG. 3 is an exploded perspective view for explaining the process of manufacturing the rotor used in the induction electric motor according to the first embodiment of the present invention.

The stacked core 5a has a plurality of holes 7d for cage-shaped windings, which are each formed so as to extend in the radial direction. The plurality of conductor bars 7a are inserted through the plurality of holes 7d in a one-to-one relation. The conductor bars 7a are each a member formed as an aluminum-made rod. The end ring 7c is fixed to ends of the plurality of conductor bars 7a on one side. The end ring 7c is a member formed as an aluminum-made disk. Also, though not shown in FIG. 3, the end ring 7b is fixed to ends of the plurality of conductor bars 7a on the other side.

In this embodiment, the rotor 5 is particularly featured in that the end rings 7b, 7c are integrally joined to the opposite ends of the conductor bars 7a for the cage-shaped windings with friction stir welding.

A manner of joining the conductor bars and the end rings of the rotor of the induction electric motor according to this embodiment with friction stir welding will be described below with reference to FIGS. 4 to 6.

Figure 4:
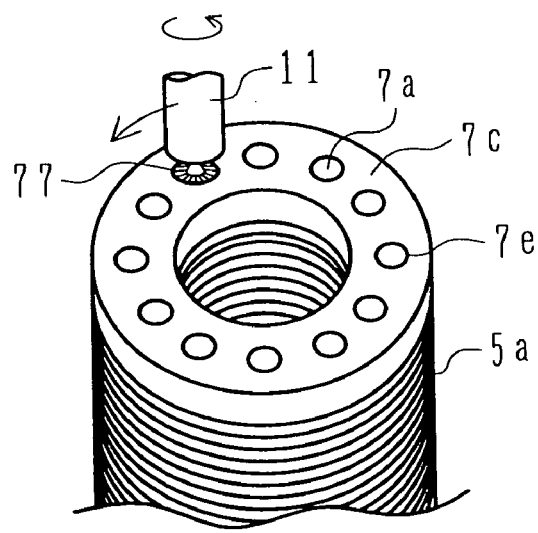
FIG. 4 is a perspective view showing a manner of joining the rotor used in the induction electric motor according to the first embodiment of the present invention.
Figure 5:
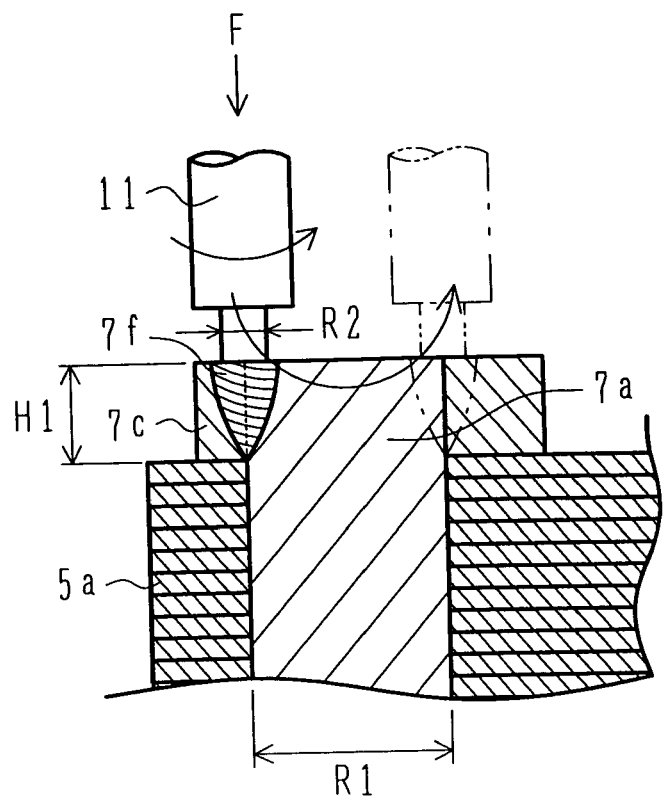
FIG. 5 is a sectional view showing a step of joining the rotor used in the induction electric motor according to the first embodiment of the present invention.
Figure 6:
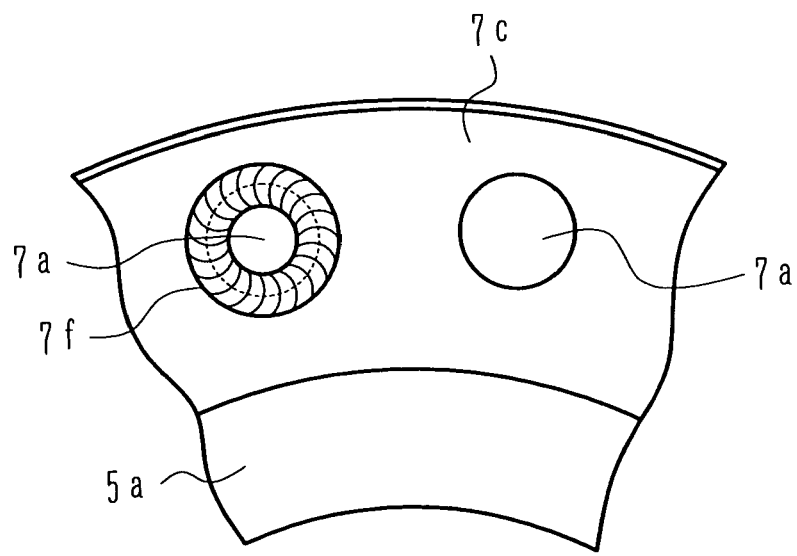
FIG. 6 is a plan view showing a state after joining the rotor used in the induction electric motor according to the first embodiment of the present invention.

FIG. 4 is a perspective view showing the manner of joining the rotor used in the induction electric motor according to the first embodiment of the present invention, FIG. 5 is a sectional view showing a step of joining the rotor used in the induction electric motor according to the first embodiment of the present invention, and FIG. 6 is a plan view showing a state after joining the rotor used in the induction electric motor according to the first embodiment of the present invention. Note that the same characters as those in FIGS. 1 to 3 denote the same parts.

As shown in FIG. 4, the end ring 7c is positioned at an end of the stacked core 5a of the rotor. The conductor bars 7a are inserted respectively through a plurality of holes 7e formed in the end ring 7c. End surfaces of the conductor bars 7a are substantially flush or coplanar with an end surface of the end ring 7c. The end ring 7c and the conductor bars 7a are joined to each other by pressing a friction stir welding tool 11 against each joint portion.

The welding tool 11 is a rod-shaped rotating tool and its tip is made of a material essentially harder than the material of the conductor bars and the end rings, which are each made of aluminum. The material of the welding tool 11 is, e.g., alloy tool steel (used for hot dies). The welding tool 11 is pressed against each of joint portions between the conductor bars 7a and the end ring 7c, and is moved along the circumference of each of the conductor bars 7a while rotating about its own axis. When the welding tool 11 is pressed against the joint portion, frictional heat is generated. With the frictional heat generated, the conductor bar 7a and the end ring 7c are caused to plastically flow for stir welding, whereby both the members are integrally joined to each other.

A description is now made of a state during joining of the rotor with reference to FIG. 5. The conductor bar 7a has a diameter R1 of, e.g., 20 mm. The end ring 7c has a thickness H1 of, e.g., 20 mm. The tip portion of the welding tool 11 has a diameter R2 of, e.g., 5 mm.

The tip of the welding tool 11 is pressed against the joint portion between the conductor bar 7a and the end ring 7c under a pressing force F. The pressing force F applied at that time is about 10 tons. The welding tool 11 is rotated at the number of rotations of, e.g., 1000 r/min. Upon the rotating welding tool 11 being pressed against the joint portion between the conductor bar 7a and the end ring 7c, frictional heat is generated, causing the conductor bar 7a and the end ring 7c to plastically flow for stir welding, whereby a weld portion 7f is formed. The welding tool 11 is moved along the circumference of the conductor bar 7a while rotating about its own axis. The moving speed of the welding tool 11 on that occasion is set to, e.g., 700 mm/min. The number of rotations and the moving speed of the welding tool 11 differ depending on the kinds, thicknesses, etc., of materials to be joined together. The number of rotations is set within the range of, e.g., about 500 to 2000 r/min, and the moving speed is set within the range of, e.g., about 200 to 1200 mm/min.

FIG. 6 shows a state of the weld portion after the welding. In the weld portion 7f, recessed marks are formed because of the pressing force F applied from the rotating tool 11 and the generated frictional heat.

By employing the friction stir welding method, the conductor bar 7a and the end ring 7c are joined to each other in solid phase while the temperature of the weld portion is kept not higher than the melting point (660° C.) of aluminum. Therefore, the weld portion contains fewer strains and is free from defects such as bubbles and cracks. On the other hand, the strength of the weld portion is comparable to or higher than that obtainable with MIG welding, and neither sputters nor fumes are generated. Further, the friction stir welding method does not require skills, and a welding apparatus is relatively inexpensive. Since the conductor bar and the end ring are not formed by aluminum die casting that has been used in the prior art, structural defects, such as porosities, can be avoided. Accordingly, characteristics of the rotary electric machine can be improved. In addition, because of the absence of porosities, an unbalance does not occur during the rotation of the rotor, and hence an unbalance correcting step is no longer required.

Further, the aluminum die casting method requires a high energy cost because of the necessity of melting aluminum at about 700° C., and also causes an environmental problem due to combustion for the melting. In contrast, in this embodiment utilizing the friction stir welding method, the energy cost can be cut down and the environmental problem is prevented.

The manufacturing process may comprise the steps of integrally joining one 7b of the end rings 7b, 7c and the conductor bars 7a with the friction stir welding method, inserting an obtained integral assembly through the holes 7d for cage-shaped windings formed in the rotor core 5a, and then integrally joining the remaining end ring 7c to the other ends of the conductor bars 7a in a similar manner with the friction stir welding.

With this embodiment, as described above, a superior rotor can be obtained because no porosities are caused and the weld portion is free from strains.

Next, the construction of an induction electric motor, i.e., a rotary electric machine, according to a second embodiment of the present invention will be described below with reference to FIGS. 7 to 8. The overall construction of the induction electric motor according to this embodiment is the same as that shown in FIG. 1. The construction of a rotor of the induction electric motor according to this embodiment is the same as that shown in FIG. 2. In this second embodiment, the friction stir welding is utilized as in the first embodiment shown in FIGS. 1 to 6, but a welding manner differs from that in the first embodiment.

Figure 7:
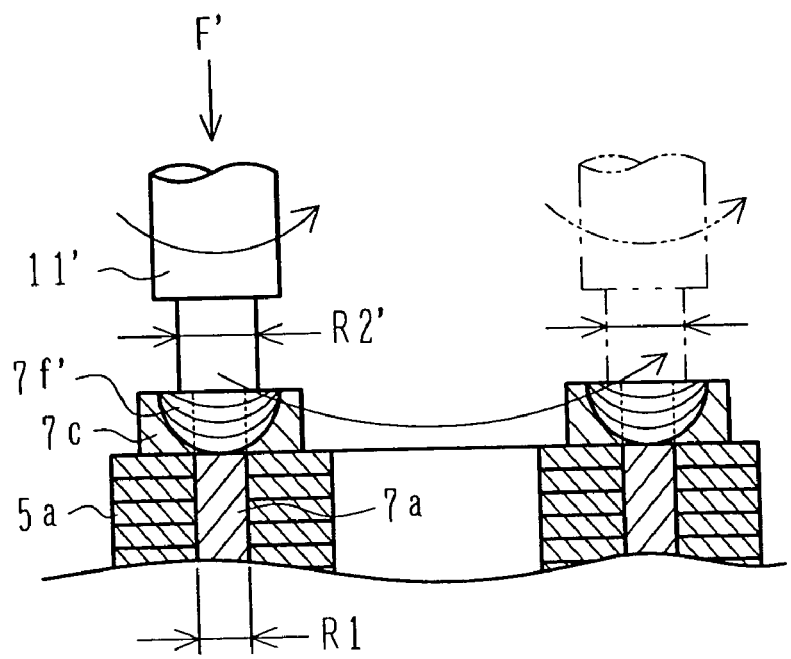
FIG. 7 is a sectional view showing a step of joining a rotor used in an induction electric motor according to a second embodiment of the present invention.
Figure 8:
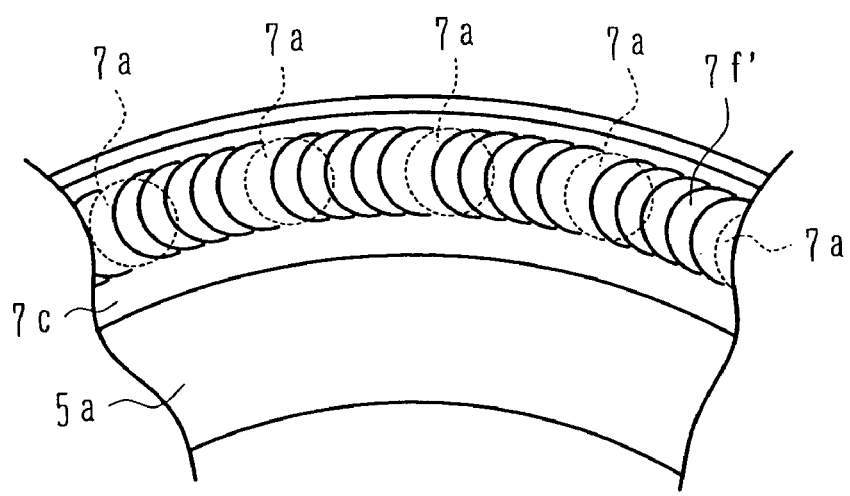
FIG. 8 is a plan view showing a state after joining the rotor used in the induction electric motor according to the second embodiment of the present invention.

FIG. 7 is a sectional view showing a step of joining a rotor used in the induction electric motor according to the second embodiment of the present invention, and FIG. 8 is a plan view showing a state after joining the rotor used in the induction electric motor according to the second embodiment of the present invention. Note that the same characters as those in FIGS. 1 to 6 denote the same parts.

As shown in FIG. 7, a tip of a welding tool 11' used in this embodiment has a diameter R2' larger than the diameter R1 of the conductor bar 7a. The tip of the welding tool 11' is pressed against a joint portion between the conductor bar 7a and the end ring 7c under a pressing force F'. The pressing force F' is proportional to an area of the joint portion. Assuming the tip of the welding tool 11' to have a diameter of 25 mm, therefore, the pressing force of about 250 tons is required. The welding tool 11' is rotated at the number of rotations of, e.g., 1000 r/min. Upon the rotating welding tool 11 being pressed against the joint portion between the conductor bar 7a and the end ring 7c, frictional heat is generated, causing the conductor bar 7a and the end ring 7c to plastically flow for stir welding, whereby a weld portion 7f' is formed. The welding tool 11' is moved in the circumferential direction of the end ring 7c while rotating about its own axis.

FIG. 8 shows a state of the weld portion after the welding. In the weld portion 7f', recessed marks are formed because of the pressing force F applied from the rotating tool 11' and the generated frictional heat.

By employing the friction stir welding method, the conductor bar 7a and the end ring 7c are joined to each other in solid phase while the temperature of the weld portion is kept not higher than the melting point (660° C.) of aluminum. Therefore, the weld portion contains fewer strains and is free from defects such as porosities. Because of the absence of porosity defects, it is possible to not only avoid the possibility that a current flowing through the conductor bars and the end rings of the rotor is impeded and torque is not produced, but also prevent a trouble from being caused by abnormal heating in a porosity portion. Further, because of the absence of porosities, an unbalance does not occur during the rotation of the rotor, and hence an unbalance correcting step is no longer required.

With this embodiment, as described above, a superior rotor can be obtained because no porosities are caused and the weld portion is free from strains.

Next, the construction of an induction electric motor, i.e., a rotary electric machine, according to a third embodiment of the present invention will be described below with reference to FIG. 9. The overall construction of the induction electric motor according to this embodiment is the same as that shown in FIG. 1. The construction of a rotor of the induction electric motor according to this embodiment is the same as that shown in FIG. 2. In this third embodiment, the friction stir welding is utilized as in the first embodiment shown in FIGS. 1 to 6, but the conductor bar and the end ring have different constructions from those in the first embodiment.

Figure 9:
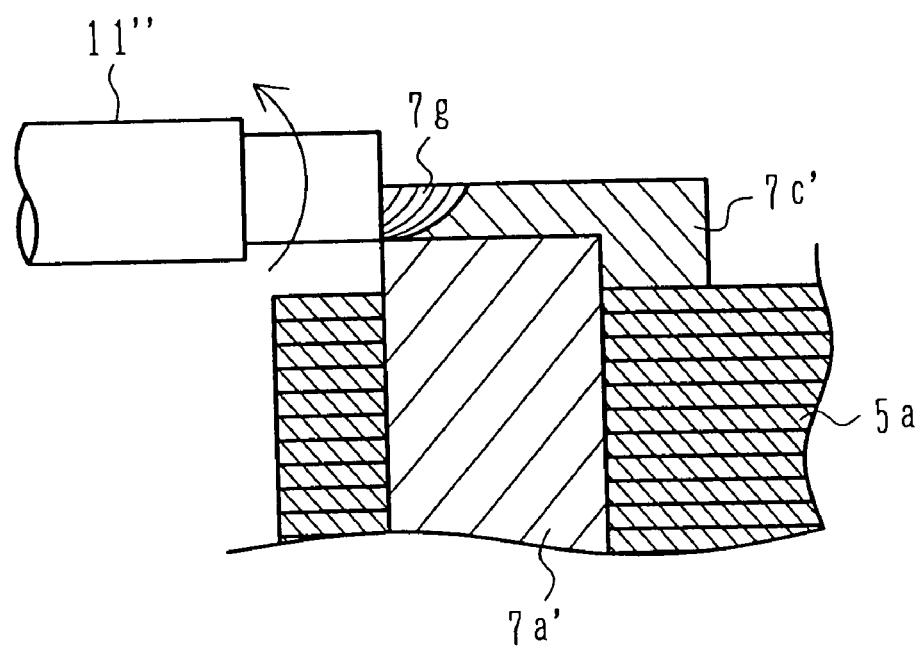
FIG. 9 is a sectional view showing a step of joining a rotor used in an induction electric motor according to a third embodiment of the present invention.

FIG. 9 is a sectional view showing a step of joining the rotor used in the induction electric motor according to the third embodiment of the present invention. Note that the same characters as those in FIGS. 1 to 6 denote the same parts.

In the embodiment shown in FIG. 5 or 7, the conductor bar 7a penetrates through the end ring 7c. On the other hand, in this embodiment, a spigot portion 7g is provided at a joint portion between a conductor bar 7a' and an end ring 7c', and these two members are fitted to each other with a spigot joint. A tip of a welding tool 11" is pressed against the spigot portion 7g and is rotated at the same time. With the rotation, frictional heat is generated, causing the conductor bar 7a' and the end ring 7c' to plastically flow for stir welding. The welding tool 11" is moved along the spigot portion 7g in the direction toward an outer periphery of the end ring 7c' while rotating about its own axis.

By employing the friction stir welding method, the conductor bar 7a' and the end ring 7c' are joined to each other in solid phase while the temperature of a weld portion is kept not higher than the melting point (660° C.) of aluminum, and therefore structural defects such as porosities are avoided. Because of the absence of porosity defects, it is possible to not only avoid the possibility that a current flowing through the conductor bars and the end rings of the rotor is impeded and torque is not produced, but also prevent a trouble from being caused by abnormal heating in a porosity portion. Further, because of the absence of porosities, an unbalance does not occur during the rotation of the rotor, and hence an unbalance correcting step is no longer required.

With this embodiment, as described above, a superior rotor can be obtained because no porosities are caused and the weld portion is free from strains.

Next, the construction of an induction electric motor, i.e., a rotary electric machine, according to a fourth embodiment of the present invention will be described below with reference to FIG. 10. The overall construction of the induction electric motor according to this embodiment is the same as that shown in FIG. 1. The construction of a rotor of the induction electric motor according to this embodiment is the same as that shown in FIG. 2. In this fourth embodiment, the friction stir welding is utilized as in the first embodiment shown in FIGS. 1 to 6, but the conductor bar has a different shape from that in the first embodiment.

Figure 10:
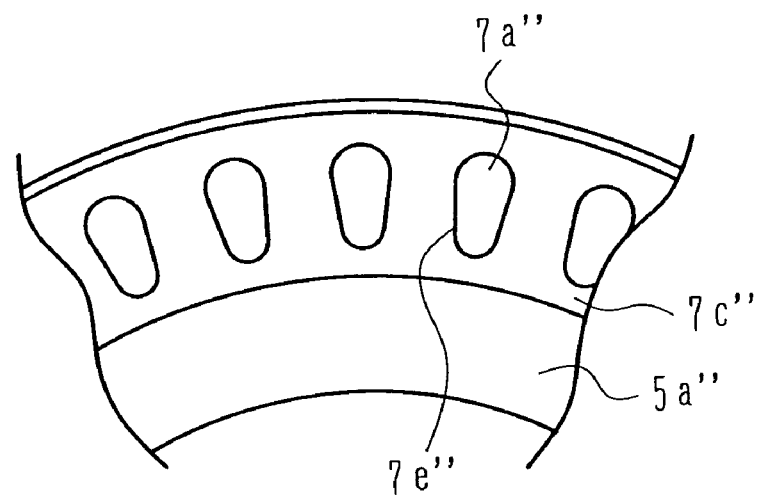
FIG. 10 is a sectional view showing a step of joining a rotor used in an induction electric motor according to a fourth embodiment of the present invention.

FIG. 10 is a sectional view showing a step of joining the rotor used in the induction electric motor according to the fourth embodiment of the present invention. Note that the same characters as those in FIGS. 1 to 6 denote the same parts.

While the conductor bar 7a shown in FIG. 6 is circular in cross section, a conductor bar 7a" in this embodiment has a cross-sectional shape of a tear droplet as shown in FIG. 10. An end ring 7c" has holes 7e" formed therein for penetration of the conductor bars 7a" through the holes 7e". Though not shown, holes each having a shape corresponding to the shape of the conductor bar 7a" are formed in a stacked core 5a". The conductor bars 7a" are inserted respectively through those holes.

The tip of the rotating welding tool is pressed against a joint portion between the conductor bar 7a" and the end ring 7c". With the pressing of the rotating welding tool, frictional heat is generated, causing the conductor bar 7a" and the end ring 7c" to plastically flow for stir welding. The welding tool is moved along a weld portion between the conductor bar 7a" and the end ring 7c" while rotating about its own axis.

With this embodiment, as described above, a superior rotor can be obtained because no porosities are caused and the weld portion is free from strains.

Next, the construction of an induction electric motor, i.e., a rotary electric machine, according to a fifth embodiment of the present invention will be described below with reference to FIG. 11. The overall construction of the induction electric motor according to this embodiment is the same as that shown in FIG. 1. A rotor of the induction electric motor according to this embodiment is a skewed rotor.

Figure 11:
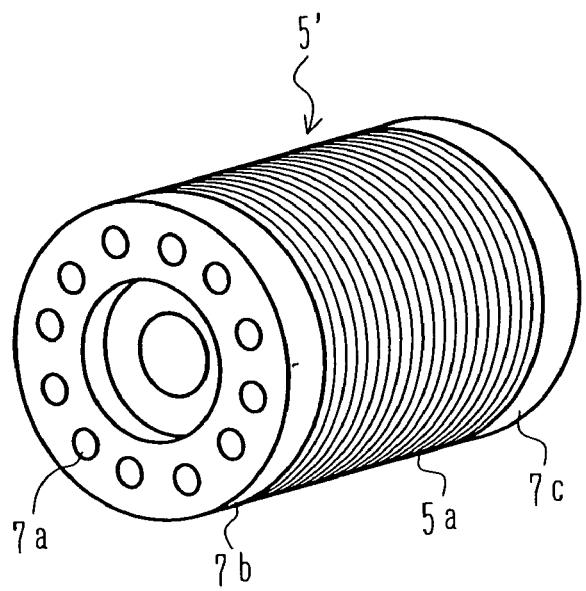
FIG. 11 is a perspective view showing the construction of a rotor used in an induction electric motor according to a fifth embodiment of the present invention.

FIG. 11 is a perspective view showing the construction of a rotor used in the induction electric motor according to the fifth embodiment of the present invention. Note that the same characters as those in FIGS. 1 to 6 denote the same parts.

In this embodiment, a rotor 5 is formed as described with reference to FIGS. 1 to 6. Then, a skewed rotor 5' can be obtained by applying, to the rotor 5, a twisting force in the rotating direction so that a skew is given to conductor bars. In FIG. 11, the skewed rotor 5' comprises a stacked core 5a, end rings 7b, 7c, and a plurality of conductor bars 7a.

A manner of forming the skewed rotor 5' may comprise the steps as follows. When electromagnetic steel sheets are stacked to form the core, the core is formed by stacking those steel sheets such that a skew is given to the core in advance. Similarly, the conductor bars are each formed into such a sectional shape as giving a skew to the conductor bars in advance. Then, the conductor bars are axially inserted through holes 7d for cage-shaped windings. Then, the conductor bars and the end rings are integrally joined to each other with the friction stir welding in a similar manner to that described above.

With this embodiment, as described above, a superior rotor can be obtained because no porosities are caused and the weld portion is free from strains.

Also, since the skewed rotor can suppress noise and pulsations in torque at the startup in comparison with the rotor having no skew, the performance of the electric motor can be improved.

Next, the construction of an induction electric motor, i.e., a rotary electric machine, according to a sixth embodiment of the present invention will be described below with reference to FIGS. 12 and 13. The overall construction of the induction electric motor according to this embodiment is the same as that shown in FIG. 1.

Figure 12:
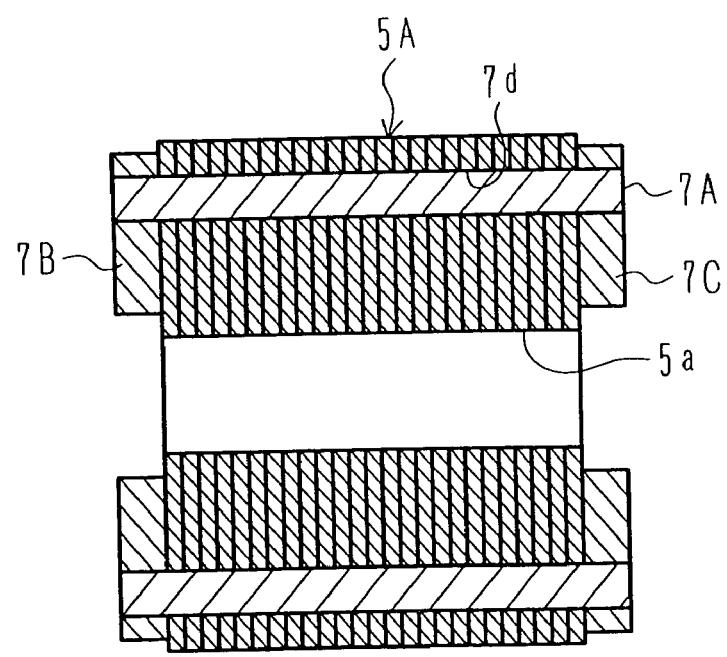
FIG. 12 is a sectional view showing the construction of a rotor used in an induction electric motor according to a sixth embodiment of the present invention.

A description is first made of the construction of a rotor used in the induction electric motor according to this embodiment with reference to FIG. 12.

FIG. 12 is a sectional view showing the construction of the rotor used in the induction electric motor according to the sixth embodiment of the present invention. Note that the same characters, as those in FIGS. 1 to 6 denote the same parts.

A rotor 5A comprises a stacked core 5a, conductor bars 7A, and the end rings 7B, 7C. The stacked core 5a is formed by stacking a predetermined number of thin electromagnetic steel sheets one above another. The stacked core 5a has a plurality of holes 7d for cage-shaped windings, which are each formed so as to extend in the axial direction. The plurality of conductor bars 7A are inserted through the plurality of holes 7d in a one-to-one relation. The end rings 7B, 7C are fixed to opposite ends of the plurality of conductor bars 7A. The conductor bars 7A and the end rings 7B, 7C constitute a cage-shaped winding unit. The conductor bars 7A are each made of aluminum. However, unlike the embodiments described above, the end rings 7B, 7C are each made of an aluminum alloy.

Here, the relationship between tensile strength and temperature of an aluminum alloy will be described with reference to FIG. 13.

Figure 13:
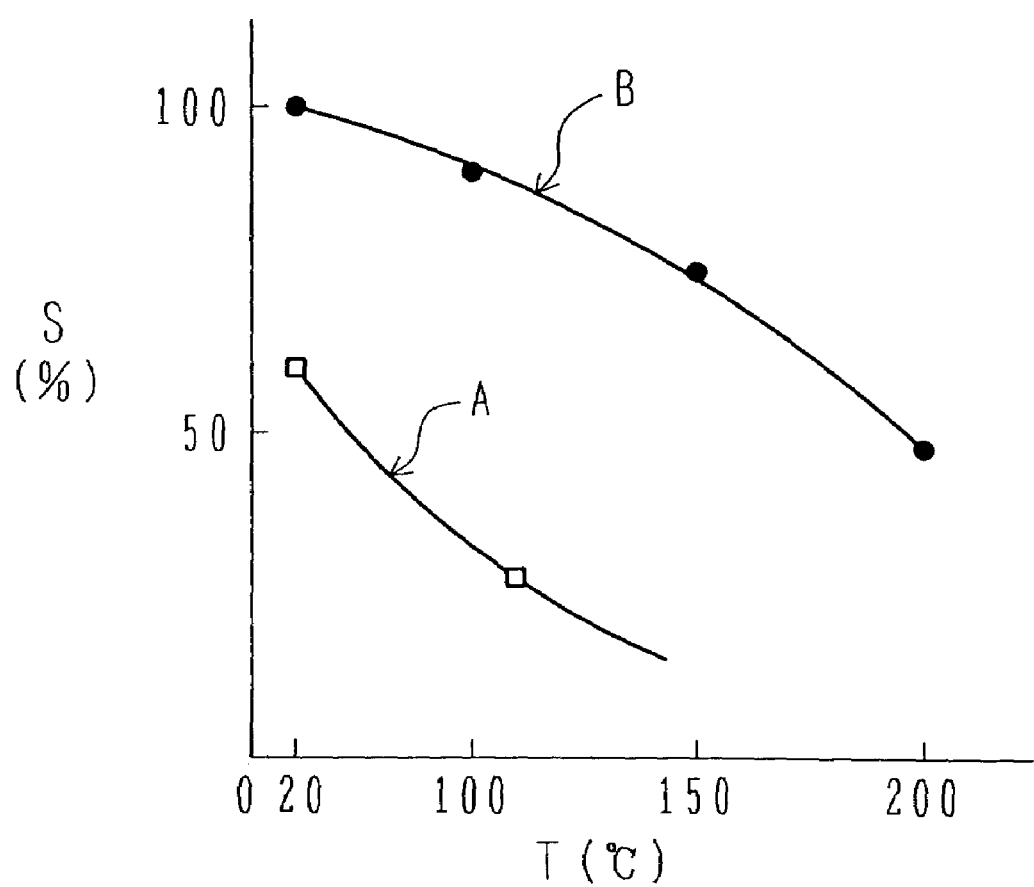
FIG. 13 is a graph for explaining the tensile strength of an aluminum alloy.

FIG. 13 is a graph for explaining the tensile strength of an aluminum alloy. In the graph of FIG. 13, the horizontal axis represents temperature T (° C.) and the vertical axis represents tensile strength S (%).

A sold line A indicates dependency of the tensile strength of aluminum with purity of 99.7% upon temperature. A sold line B indicates dependency of the tensile strength of an aluminum alloy upon temperature. In FIG. 13, on an assumption that the tensile strength of an aluminum alloy at 20° C. is set to 100%, the tensile strength at another temperature and tensile strength of aluminum are plotted as relative values.

The term "aluminum alloy" used herein means a die-cast aluminum alloy called ADC12 and is an Al—Si—Cu based alloy in which Si is in the range of 10.5 to 12%. The tensile strength of the aluminum alloy is about 300 MN/m$^2$ at room temperature and is about twice that of pure aluminum. Also, the aluminum alloy has such temperature characteristics that the tensile strength is reduced just about 25% at 150 (° C.) and ensures a strong property at relatively high temperature. In other words, as shown in FIG. 13, the aluminum alloy has greater tensile strength and a less reduction in strength at relatively high temperature than aluminum.

In the induction electric motor, a current flows through the rotor based on electromagnetic induction with magnetic flux generated from the stator. While a rotating force is applied to the rotor under the action of the magnetic flux and the current, Joule heat is produced with the current flowing through the rotor and hence the temperature of the rotor is increased. It is general that the temperature of the rotor is about 150 (° C.) in ordinary condition of use.

Recently, the size of induction electric motors has been reduced and the number of rotations of induction electric motors in use has been increased in many cases. In the field of grinders, for example, the machining accuracy is improved by increasing the number of rotations of a main spindle and increasing the circumferential speed of a blade. The circumferential speed of electric motors used in the field of grinders has been 150 m/min at maximum in the past, but a circumferential speed of 200 m/min is demanded at present.

While in a conventional induction electric motor electromagnetic steel sheets, conductor bars and end rings constituting a rotor are given with high tension, the conductor bars, etc. are made of a non-iron metal, such as aluminum. Accordingly, the highly tensile electromagnetic steel sheets have a higher tensile strength of the material itself, and the allowable maximum number of rotations is decided depending on the mechanical strength of the material of the conductor bars including the end rings.

Calculating the strength of a rotor rotating at a high speed, it is understood that inner peripheral stresses in an inner diameter portion of the stacked core and inner peripheral stresses of the end rings are high. Because, of the components of the rotor, the tensile strength of the end ring material is smaller than that of the stacked core, the strength of the rotor is decided depending on the inner peripheral stresses of the end ring.

For that reason, in this embodiment, the end rings are made of an aluminum alloy that has a high tensile strength and a less reduction in strength at high temperatures. Then, hetero-metals, i.e., the conductor bars 7A made of pure aluminum and the end rings 7B, 7C made of the aluminum alloy, are integrally joined to each other with the friction stir welding described above, whereby the rotor is constructed.

The specific resistance of the aluminum alloy is 7.3 $\mu\Omega$cm, while the specific resistance of the pure aluminum is 3.4 $\mu\Omega$cm. In other words, the specific resistance of the aluminum alloy is twice that of the pure aluminum. Accordingly, if the aluminum alloy is used as the conductor bar, Joule heat produced by the rotor is increased twice and the temperature of the rotor rises correspondingly. Also, slippage of the rotor is doubled, which may result in a reduction of performance. In this embodiment, therefore, pure aluminum is used as the material of the conductor bars 7A.

On the other hand, if the aluminum alloy is used as the end rings, Joule heat is generated in an increased amount. However, by reducing the inner diameter of the end rings 7B, 7C, as shown in FIG. 12, to increase the cross-sectional area of the end rings 7B, 7C as compared with that of the end rings 7b, 7c shown in FIG. 2, the resistance value of each end ring shown in FIG. 12 is made equal to that of each end ring shown in FIG. 2. Hence, the end rings shown in FIG. 12 generates Joule heat comparable to that of the end rings shown in FIG. 2. Since the performance of an electric motor depends on not only the resistance value, but also the shape and dimensions of the conductor bars, electric motors compatible in performance cannot be provided only when the resistance value is equal. However, the factor of the end rings affecting the performance of an electric motor is only the resistance value of the end rings.

As the aluminum alloy, hydronalium, for example, can be used in addition to ADC12. Hydronalium is an Al—Mg—base alloy in which Mg is in the range of 7 to 9%. The tensile strength of hydronlrium is 18 kg/mm$^2$, which is higher than that (9 to 17 kg/mm$^2$) of the pure aluminum.

With this embodiment, as described above, a superior rotor can be obtained because no porosities are caused and the weld portion is free from strains.

Also, a rotor having a higher strength and being able o rotate at high speeds can be obtained.

INDUSTRIAL APPLICABILITY

According to the present invention, a rotary electric machine including a rotor free from porosities can be provided.

What is claimed is:

1. A rotary electric machine comprising a stator and a rotor arranged in an opposed relation to said stator,
    said rotor comprising a core, a plurality of conductor bars insertable respectively through a plurality of holes axially formed in said core, and end rings having internal and external side faces attached to opposite ends of said conductor bars, the conductor bars sized to be substantially flush with an external side face of said end rings in an assembled state of said rotor,
    wherein said conductor bars and said end rings are made of an aluminum material, and
    opposite ends of said conductor bars are individually electrically and mechanically joined via a plastic flow-created friction stir welding connection at the external side face of said end rings.

2. A rotary electric machine comprising a stator and a rotor arranged in an opposed relation to said stator,
    said rotor comprising a core, a plurality of conductor bars insertable respectively through a plurality of holes axially formed in said core, and end rings having internal and external side faces attached to opposite ends of said conductor bars, the conductor bars being sized to be substantially flush with an external side face of said end rings in an assembled state of said rotor,
    wherein said conductor bars and said end rings are made of an aluminum material, and
    said end rings opposite ends of said conductor bars are individually electrically and mechanically joined via a plastic-flow caused friction stir welding connection at the external side face of said end rings such that a locus formed by the friction stir welding is drawn in conformity with a shape of each said end ring.

3. A rotary electric machine comprising a stator and a rotor arranged in an opposed relation to said stator,
    said rotor comprising a core, a plurality of conductor bars insertable respectively through a plurality of holes axially formed in said core, and end rings having internal and external side faces attached to opposite ends of said conductor bars, the conductor bars being sized to be substantially flush with an external side face of said end rings in an assembled state of said rotor,
    wherein said conductor bars and said end rings are made of an aluminum material, and
    opposite end of said conductor bars are individually electrically and mechanically joined via a plastic-flow caused friction stir welding connection at the external side face of said end rings such that a plurality of loci formed by the friction stir welding are individually drawn in conformity with shapes of each of said conductor bars.

4. A rotary electric machine comprising a stator and a rotor arranged in an opposed relation to said stator,
said rotor comprising a core, a plurality of conductor bars insertable respectively through a plurality of holes axially formed in said core, and end rings having internal and external side surfaces attached to opposite ends of said conductor bars,
wherein said conductor bars and said end rings are made of an aluminum material, and
end surfaces of said conductor bars and the external side surface of each said end ring flush with the end surfaces in an assembled state of said rotor are individually electrically and mechanically joined to each other via a plastic flow-caused friction stir welding connection.

5. A rotary electric machine comprising a stator and a rotor arranged in an opposed relation to said stator,
said rotor comprising a core, a plurality of conductor bars insertable respectively through a plurality of holes axially formed in said core, and end rings having an internal and external side surfaces attached to opposite ends of said conductor bars, the conductor bars being sized to be substantially flush with the external side surface of each of said end rings in an assembled state of said rotor,
wherein said conductor bars and said end rings are made of an aluminum material, and
said conductor bars are fitted to a groove formed in said end ring, and a peripheral surface of said end ring is electrically and mechanically joined to one surfaces of said conductor bars via a plastic flow-caused friction stir welding connection.

6. A rotary electric machine according to claim 1, wherein an aluminum alloy is used as the aluminum material forming said end rings.

7. A rotary electric machine according to any one of claim 2, wherein an aluminum alloy is used as the aluminum material forming said end rings.

8. A rotary electric machine according to claim 3, wherein an aluminum alloy is used as the aluminum material forming said end rings.

9. A rotary electric machine according to claim 4, wherein an aluminum alloy is used as the aluminum material forming said end rings.

10. A rotary electric machine according to claim 5, wherein an aluminum alloy is used as the aluminum material forming said end rings.

11. A rotary electric machine according to claim 1, wherein pure aluminum alloy is used as the aluminum material forming said conductor bars, and
an aluminum alloy is used as the aluminum material forming said end rings.

12. A rotary electric machine according to claim 2, wherein pure aluminum alloy is used as the aluminum material forming said conductor bars, and
an aluminum alloy is used as the aluminum material forming said end rings.

13. A rotary electric machine according to claim 3, wherein pure aluminum alloy is used as the aluminum material forming said conductor bars, and
an aluminum alloy is used as the aluminum material forming said end rings.

14. A rotary electric machine according to claim 4, wherein pure aluminum alloy is used as the aluminum material forming said conductor bars, and
an aluminum alloy is used as the aluminum material forming said end rings.

15. A rotary electric machine according to claim 5, wherein pure aluminum alloy is used as the aluminum material forming said conductor bars, and
an aluminum alloy is used as the aluminum material forming said end rings.

16. A rotary electric machine according to claim 1, wherein said rotor is a skewed rotor.

17. A rotary electric machine according to claim 2, wherein said rotor is a skewed rotor.

18. A rotary electric machine according to claim 3, wherein said rotor is a skewed rotor.

19. A rotary electric machine according to claim 4, wherein said rotor is a skewed rotor.

20. A rotary electric machine according to claim 5, wherein said rotor is a skewed rotor.

21. A method of producing a rotor for a rotary electric machine, comprising
inserting a plurality of conductor bars made of aluminum material respectively through a plurality of holes axially formed in a rotor core,
attaching end rings made of aluminum material to opposite ends of said conductor bars such that end faces of said conductor bars are substantially flush with an external side face of each of said end rings, and
individually electrically and mechanically joining opposite ends of each of said conductor bars via a plastic flow-created friction stir welding connection at the external side face of said end rings.

22. A method of producing a rotor for a rotary electric machine, comprising
inserting plurality of conductor made of aluminum material respectively through a plurality of holes axially formed in a rotor core,
attaching end rings made of aluminum material to opposite ends of said conductor bars such that end faces of said conductor bars are substantially flush with an external side face of each of said rings, and
individually electrically and mechanically joining opposite ends of each of said conductor bars via a plastic-flow caused friction stir welding connection at the external side face of said rings such that a locus formed by the friction stir welding is drawn in conformity with a shape of said end ring.

23. A method of producing a rotor for a rotary electric machine, comprising
inserting plurality of conductor made of aluminum material respectively through a plurality of holes axially formed in a rotor core,
attaching end rings made of aluminum material to opposite ends of said conductor bars such that end faces of said conductor bars are substantially flush with an external side face of each of said rings, and
individually electrically and mechanically joining opposite ends of each of said conductor bars via a plastic-flow caused friction stir welding connection at the external side face of said rings such that a plurality of loci formed by the friction stir welding are drawn in conformity with shapes of said conductor bars.

24. A method of producing a rotor for a rotary electric machine, comprising
inserting a plurality of conductor bars made of aluminum material respectively through a plurality of holes axially formed in a rotor core,
attaching end rings made of aluminum material to opposite ends of said conductor bars are substantially flush with an external side face of each of said end rings, and individually electrically and mechanically joining each of the end surfaces of said conductor bars and a lateral surface of each said end ring via a plastic flow-caused friction stir welding connection.

25. A method for producing a rotor for a rotary electric machine, comprising inserting a plurality of conductor bars made of aluminum material respectively through a plurality of holes axially formed in a rotor core, attaching end rings made of aluminum material to opposite ends of said conductor bars such that end faces of said conductor bars are substantially flush with an external side face of each of said end rings, and fitting said conductor bars to a groove formed in each said end ring, and a individually electrically and mechanically joining peripheral surface of said end ring to said conductor bars via a plastic flow-caused friction stir welding connection.

* * * * *